(12) United States Patent
Bricelj et al.

(10) Patent No.: US 7,289,787 B2
(45) Date of Patent: Oct. 30, 2007

(54) SYSTEM AND METHOD FOR CALCULATION OF TELECOMMUNICATION CHARGES

(75) Inventors: Andreas Bricelj, Berlin (DE); Pascal De Clercq, Drongen (BE)

(73) Assignee: Siemens AG, München (DE)

( * ) Notice: Subject to any disclaimer, the term of this patent is extended or adjusted under 35 U.S.C. 154(b) by 468 days.

(21) Appl. No.: 10/461,828

(22) Filed: Jun. 16, 2003

(65) Prior Publication Data

US 2004/0015370 A1 Jan. 22, 2004

Related U.S. Application Data

(63) Continuation of application No. PCT/DE01/04870, filed on Dec. 20, 2001.

(30) Foreign Application Priority Data

Jan. 3, 2001 (DE) ................. 101 00 150

(51) Int. Cl.
*H04M 11/00* (2006.01)
*H04M 15/00* (2006.01)

(52) U.S. Cl. .............. 455/406; 455/405; 455/407; 455/408; 379/114.03; 379/114.06

(58) Field of Classification Search ........... 455/405, 455/406, 407
See application file for complete search history.

(56) References Cited

U.S. PATENT DOCUMENTS

| 5,109,401 A | * | 4/1992 | Hattori et al. | 455/407 |
|---|---|---|---|---|
| 5,303,297 A | * | 4/1994 | Hillis | 455/406 |
| 5,577,100 A | * | 11/1996 | McGregor et al. | 455/406 |
| 5,631,947 A | * | 5/1997 | Wittstein et al. | 379/114.17 |
| 5,748,052 A | * | 5/1998 | Hasegawa | 333/1.1 |
| 5,758,288 A | * | 5/1998 | Dunn et al. | 455/456.5 |
| 5,784,442 A | * | 7/1998 | Foti | 455/405 |
| 6,018,652 A | * | 1/2000 | Frager et al. | 455/406 |
| 6,148,191 A | * | 11/2000 | Kim | 455/407 |
| 6,249,573 B1 | * | 6/2001 | Hudson | 379/114.2 |
| 6,311,054 B1 | * | 10/2001 | Korpela | 455/406 |
| 6,321,078 B1 | * | 11/2001 | Menelli et al. | 455/407 |
| 6,542,728 B1 | * | 4/2003 | Kaku | 455/406 |
| 6,804,505 B1 | * | 10/2004 | Nilsson et al. | 455/406 |

FOREIGN PATENT DOCUMENTS

| DE | 19706779 A1 | 8/1998 |
|---|---|---|
| DE | 19737255 A1 | 3/1999 |
| DE | 19706779 C2 | 5/2000 |

(Continued)

OTHER PUBLICATIONS

Derwent-Abstract—EP0526118; Mar. 22, 2000; Motorola Inc, US-Schaumburg, IL 60196.

(Continued)

*Primary Examiner*—Ahmad F. Matar
*Assistant Examiner*—Aamir Haq

(57) ABSTRACT

The present invention relates to a method and a communication system for the current calculation of fees for a user of the telecommunication system. The present system includes a fee calculation station which is adapted to calculation the fees in accordance with a clocking and a fee rate associated with a predetermined service depending upon the period of use of the service.

18 Claims, 2 Drawing Sheets

FOREIGN PATENT DOCUMENTS

| | | |
|---|---|---|
| EP | 0526118 A2 | 2/1993 |
| EP | 0647055 A1 | 4/1995 |
| EP | 0734114 A2 | 9/1996 |
| EP | 0526118 B1 | 3/2000 |
| WO | WO 98/59504 | 12/1998 |
| WO | WO01/30061 | 4/2001 |

OTHER PUBLICATIONS

Derwent-Abstract—EP0734144; Aug. 18, 1999; Siemens AG, D-80333 München.

Derwent-Abstract—DE19706779; Aug. 27, 1998; Siemens AG, D-80333 München.

Derwent-Abstract—DE19737225; Mar. 4, 1999; Deutsche Telekom AG, D-53113 Bonn.

DE19706779 Derwent Abstract.

EP734144 Derwent Abstract.

* cited by examiner

DAT1

| TEI | TAR [Preis/sekunde] | TAK | DIE | STA |
|-----|---------------------|-----|-----|-----|
| A   | 10                  | 1   | SPR | J   |
| B   | 5                   | 10  | FAX | N   |
| ⋮   | ⋮                   | ⋮   | ⋮   | ⋮   |

Fig. 4

DAT2

| TEI | TAK | DIE |
|-----|-----|-----|
| A   | 1   | SPR |
| B   | 10  | FAX |
| ⋮   | ⋮   | ⋮   |

Fig. 5

SYSTEM AND METHOD FOR CALCULATION OF TELECOMMUNICATION CHARGES

CONTINUATION DATA

The present invention is a continuation of international application number PCT/DE01/04870, filed Dec. 20, 2001, and claims priority from German patent application 10100150.9, filed Jan. 3, 2001, both of which are herein incorporated by reference.

BACKGROUND OF THE INVENTION

The present invention relates to a method for the calculation of charges in a telecommunication system over a select period of time The time period may be ongoing or continuous. The present method employs a charge calculation point which is equipped to receive information about a particular and/or current tariff rate. At the calculation point, charges incurred on the basis of the tariff rate along with the period of use of a service to which the tariff rate applies are calculated. The precision of charge accounting, i.e. time unit upon which a charge is based—such as an amount per every 1, 10 or 60 seconds—is determined by the clocking or sampling of the time interval on which the charge calculation is based. This can be predetermined by a service operator setting the tariff. In other words, usage of service is sampled to determine the time it was used and such time is then divided by the precision to arrive at a toll for the usage. The charge calculation point is also equipped to transmit information about the charges incurred to a subscriber at predetermined time intervals.

The invention also relates to a telecommunication system comprising a charge calculation point which is equipped to calculate the charges incurred for the use of a service on the basis of a tariff rate assigned to the service. In addition, the charge calculation point is equipped to calculate the period of use of the service, with the precision of charge accounting being determined by the clocking of the time interval on which the charge calculation is based, the time interval being potentially predetermined by a network/service operator setting the tariff. The charge calculation point is also equipped to transmit information about the charges incurred to a telecommunication terminal of a subscriber at predetermined time intervals.

Herein, the term services refers to the provision of the capabilities and features of a telecommunication system, for example the transfer of voice or data, as well as switching activities along with the provision of a network and the like. Other telecommunication services may be included under the term services as is envisioned by one skilled in the art.

With the introduction of the transfer of payment information for end customers using services, for example a voice service, the tariffs used for charging, which are in the form of price per unit of time, are transmitted by a service operator setting the tariff for the service to a subscriber network operator with the operator calculating the charges according to its accounting and making the calculated charges available to its end customers/subscribers in the form of payment information.

Tariff information determined for example by international—ETSI ES 201 296—and national standards is also specified here in the form of a price per unit of time—generally as a price per second.

Charges can be output on a subscriber's telecommunication terminal according to the prior art depending on the set-up and facilities of the terminal either in currency format or in charge pulses. The charges incurred are hereby determined as a product of elapsed time, for example in seconds, and the tariff rate, for example the price per second.

Accounting by the service operator setting the tariff can only correspond to the display of charges at the telecommunication terminal if the accounting precision of the subscriber network operator is the same as that of the service operator setting the tariff.

If the service operator sets the tariff charges with a precision of 60 seconds, and the subscriber network operator setting the tariff charges with a precision of one second, the display of charges at the subscriber's telecommunication terminal will not correspond to the costs actually resulting for said subscriber. For example, a tariff for a service is assumed to be EUR 0.005/sec, accounting precision of the subscriber network operator one second, and accounting precision of the switching network operator 60 seconds. In the case of a call lasting 20 seconds, a call charge of EUR 0.1 is displayed at the subscriber's telecommunication terminal but the network operator setting the tariff computes EUR 0.3 in post-processing and charges for this, as its accounting precision is based on a time interval which is three times longer than that of the subscriber network operator.

It can be seen from the above that the subscriber has to pay three times more than is displayed. This can of course result in subscriber dissatisfaction. It is therefore in the interests of both the subscriber and the network operator to output the actual or real costs incurred at the subscriber's telecommunication terminal.

Post processing here refers to the fact that charges are calculated after termination of use of the service. Charges should however be shown online, i.e. as synchronously or real time as possible with the use of the service at the subscriber's telecommunication terminal.

The only known means of making the charge display and accounting correspond is to bring the accounting precision of the network operator providing a service and setting the tariff into line with the accounting precision of the subscriber network operator. However this results in a significant restriction on charging options for the network operators providing the telecommunication services.

The calculated charge information is also of significance with regard to cost monitoring for services, for which exceeding a certain cost limit when using the service is automatically prevented.

When the accounting precisions of the subscriber network operators and service providers are different, there is no known possible means of ensuring precise compliance with this cost limit. Accordingly, a need exists to harmonize the accounting.

SUMMARY OF THE INVENTION

It is therefore an object of the present invention to facilitate calculation of the actual costs of use of a telecommunication service, during the use, and on an ongoing basis. This and other objects are achieved by a method wherein information about the clocking of the network/service operator setting the tariff is transmitted to the charge calculation point along with the product of the tariff rate per unit of time, the clocking is established to calculate the charges incurred, and this product is totaled up based on the period of use over a predetermined number (n) of clockings.

The inventive method allows differences in accounting precision, for example between a subscriber network operator and a service operator setting a tariff to be taken into account and the subscriber to be informed of the charges actually incurred on an ongoing basis.

In order to inform subscribers of the current cost situation, charge information may be displayed on a charge display at a subscriber telecommunication terminal.

In another embodiment of the present invention, a predeterminable value for clocking assigned to at least one subscriber and/or at least one service is stored in a database.

A high level of charging flexibility may be achieved by basing clocking on the type of telecommunication service used.

Still another embodiment of the invention provides for the telecommunication system having at least two networks and when the subscriber uses a cross-network service, clocking is determined by a gateway operator, with information about clocking being transmitted by the gateway operator to the charge calculation point.

In another embodiment, clocking is controlled by a service control center based on the subscriber and/or the service, and information about clocking is transmitted to the charge calculation point.

The present invention also comprises a telecommunication system equipped to transmit information about clocking to the charge calculation point and to establish the product of the tariff rate and clocking to calculate the charges incurred and to total up this product based on the period of use over a predeterminable number of clockings.

The telecommunication system is advantageously equipped to display information about the charges incurred on a charge display at the subscriber's telecommunication terminal. Further, at least one database is provided, in which a predetermined value for clocking assigned to at least one subscriber and/or at least one service is stored.

In order to have a high level of flexibility with respect to charges, it is advantageous for clocking to be based on the type of service used.

The invention may also include the provision of at least two subscriber networks, which are connected together by means of a gateway, with clocking being established by the gateway when the subscriber uses a cross-network telecommunication service and information about clocking being transmitted by the gateway to the charge calculation point.

Another embodiment of the invention provides for a service control center, which is equipped to control clocking based on the subscriber and/or the telecommunication service and to transmit information about clocking to the charge calculation point.

BRIEF DESCRIPTION OF THE SEVERAL VIEWS OF THE DRAWINGS

The novel features believed characteristic of the invention are set out in the claims below. The invention itself, however, as well as other features and advantages thereof, are best understood by reference to the detailed description, which follows, when read in conjunction with the accompanying drawings, wherein:

FIG. 4 depicts a database of a service control center; and

FIG. 5 depicts a database of a charge calculation point.

DETAILED DESCRIPTION OF THE INVENTION

Figure 1:
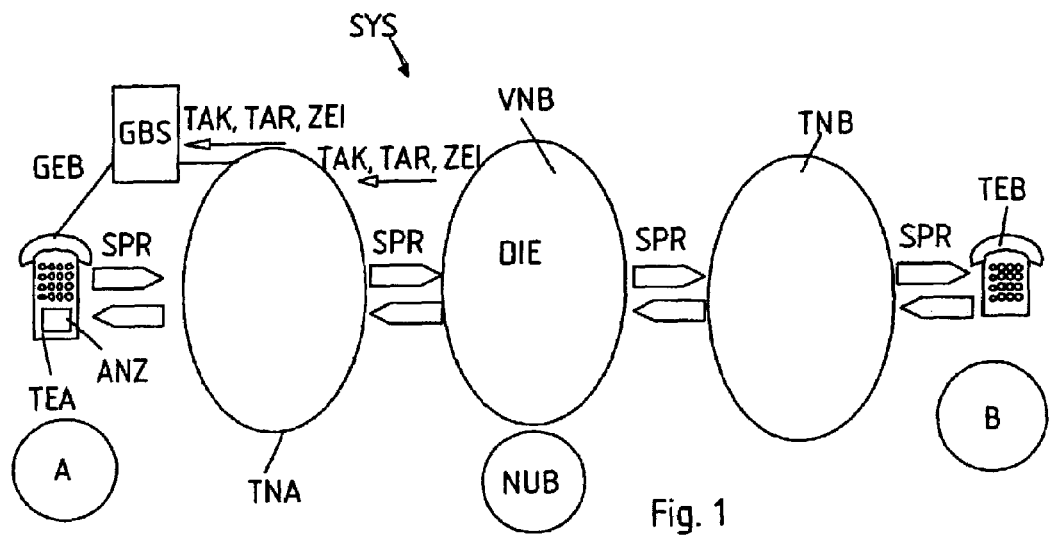
FIG. 1 depicts an embodiment of a telecommunication system according to the invention.

Referring to FIG. 1, a first embodiment of a telecommunication system SYS according to the invention is depicted. The system comprises a first subscriber network TNA, a second subscriber network TNB and a connecting network VBN connecting the two subscriber networks. Connecting network VBN includes the function of a gateway NUB between the two networks.

The telecommunication system SYS also has at least one telecommunication terminal TEA which is equipped to output the charges GEB incurred on a display ANZ when a service DIE, for example a switching service, is used. The display may be specifically designed for this purpose.

In the present example, a subscriber A assigned to the first subscriber network TNA makes a call from his telecommunication terminal TEA, for example an ISDN terminal, to a second subscriber B assigned to the second telecommunication network TNB at his telecommunication terminal TEB, for example also an ISDN terminal, using a switching/connection service DIE assigned for the connecting network VBN. To display the charges GEB incurred during an exchange of voice messages SPR between the two subscribers A, B, the telecommunication terminal TEA of the first subscriber A has a display ANZ.

The charges GEB incurred are determined by the service operator setting the tariff, in this case the connecting network operator, and have to be paid by subscriber A as the caller. The operator of the connecting network VNB transmits information about the period of use of the service DIE and its accounting precision to the operator of the first subscriber network TNA in the manner described above. These charges are then calculated at a charge calculation point GBS of the first subscriber network TNA.

As used herein, accounting precision refers to the shortest time interval of relevance to the calculation of charges. This time interval corresponds to a clocking TAK of the period of use of the service DIE. Generally the accounting precision or clocking TAK may be 1, 10 or 60 seconds, with other time intervals also possible.

As discussed above, if the network operators have different accounting precisions or clockings TAK, this can mean that the charge information displayed at the telecommunication terminal TEA does not correspond to the charges GEB which actually have to be paid by the subscriber A.

In order to take into account the different accounting precisions of different network operators, ongoing charges serving as information for subscriber A are calculated taking into account the clocking TAK predetermined by the network operator setting the tariff.

In this case the clocking TAK is transmitted by the operator of the connecting network VBN as additional information with the standard information, such as tariff rate TAR and period of use ZEI of the service DIE, to the charge calculation point GBS of the first subscriber network TNA. The clocking TAK may be transferred according to the ITU-T Q.763 standard, with the clocking TAK being defined and transferred as an additional parameter. The parameter "clocking" may be defined as an extension of the national ISUP standard and the code can be determined for the parameter.

So that subscriber network operators TNA, which cannot yet interpret the parameter, reject it, the associated parameter compatibility information must be preceded by "do not release call" and "do not transmit notification".

The newly defined parameter "clocking" can be transferred to the charge calculation point GBS in an existing ISUP message while the call is being set up. The following messages are used for this:
Address Complete
Answer
Connect
Call Progress A restriction, e.g. to the Answer and Connect messages, simplifies the process to some extent, as only an Answer or Connect is transmitted/received while the call is being set up (thus avoiding the problem of explaining what should happen, if clocking is received more than once—it would then be necessary to define for example: "the last clocking received before Answer applies").

Another possible means of transferring clocking is to specify the clocking as an extension according to the ASN.1 structure for Charging Tariff Information in accordance with the ETS 201 296 standard. With the ASN.1 structure referred to above, an extension field is provided, which is defined in such a way that project-specific extensions are possible. One possibility for transferring the clocking is to extend the extension field to include the values for the clocking TAK and to transfer it with the information about the tariff TAR to the charge calculation point GBS. As an alternative to transferring the clocking TAK via the tariff definition extension, a new national parameter can be defined for the clocking TAK.

The following values can for example be used for the clocking TAK: clocking=1 . . . 60, with the unit being one second. For calculating the charges GEB at the charge calculation point GBS at a time T with a tariff rate TAR for the service DIE used and a clocking TAK, subject to charge calculation starting at time T=0 of call acceptance, the time interval for the period of use [0 . . . T] relevant to the charge calculation can be broken down into time intervals $$[t_i \ldots t_{i+1}], i=0, \ldots, n$$

with the characteristic $$t_0=0,$$

$$t_{i+1}=t_i+TAK \text{ for } i=0, \ldots, n.$$

Should the charge become payable at the start of a time interval, the value of n is selected so that the following relationship applies:

$$T_n \leq T < t_{n+1}.$$

If the precondition is only required for the first time interval, the value of n for T=0 is selected so that n=0 applies.

For T≠0 n is selected so that $t_n < T \leq t_{n+1}$ applies.

The payment display GEB output at the telecommunication terminal TEL is then:

$$GEB = \sum_{i=0}^{n} (t_{i+1} - t_i) * TAR(t_i),$$

in which $(t_{i+1}-t_i)$ is the smallest time interval used for accounting purposes, $TAR(t_i)$ is a time-dependent tariff rate and n the number of clockings TAK, over which the total is calculated.

Non-time-dependent parts of charges, e.g. switching charges, are not explicitly taken into account here, as they are not relevant to the present example. Non-time-dependent parts of charges can if necessary be included in the charge calculation in an additive manner.

In addition to the payment display of the charges GEB actually incurred (see above), the clocking can also be used in the output of the anticipated charges at the start of a call, e.g. ETSI Supplementary Service AOC-S, etc. The price can then be displayed to the subscriber in the form TAR*TAK per accounting unit (TAK). This could then be displayed at the terminal for example for a tariff rate TAR EUR 00.01/s and a clocking=60 s as follows: "EUR 0.6/60 s".

Figure 2:
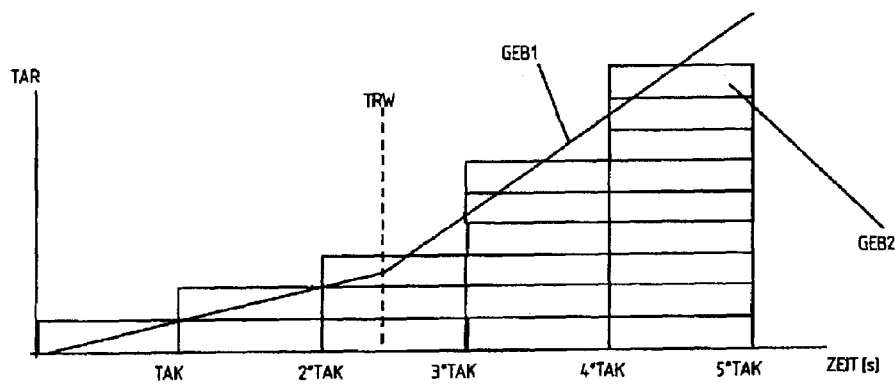
FIG. 2 depicts a graphic illustration of the calculated charges, with the time shown on the x-axis and a current tariff rate on the y-axis.

Referring to FIG. 2, at the start of the current interval the price for this interval is calculated and displayed taking into account clocking and a charge amendment, for example due to a change of tariff TRW is not activated until the next interval. In the figure, the charge GEB forwarded as information to the subscriber is calculated and displayed for two different clockings. The first charge GEB1 is calculated on the basis of a time-dependent tariff rate TAR and a clocking TAK of one second, while the second charge GEB2 is calculated with the same tariff rate TAR and a clocking TAK of one minute.

It is expedient generally to select one second as the time interval to which the tariff rate TAR relates, although a tariff rate TAR based on the clocking is possible. However, determining the tariff rate TAR on a second basis ensures that the same tariff database can be accessed for subscribers TEI with different accounting models.

Figure 3:
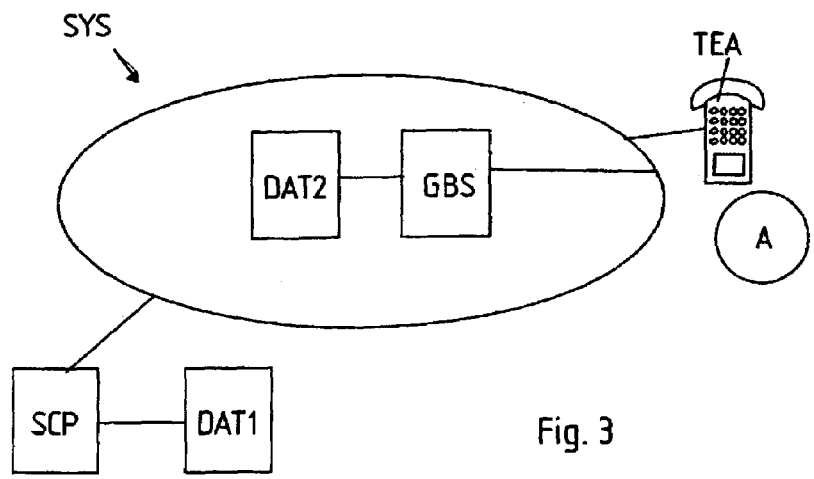
FIG. 3 depicts another embodiment of a telecommunication system.

Referring to FIG. 3, a telecommunication system SYS according to the invention can have a service control center SCP, which transmits the clocking TAK to the charge calculation point GBS based on a predeterminable service. For this purpose, the service control center SCP can access a database DAT1, in which clockings TAK assigned to predeterminable subscribers A, B are stored. The service control center SCP can also write into the database. A database DAT2, in which the subscriber profiles are stored locally, can also be directly assigned to the charge calculation point GBS.

Referring to FIG. 4, a specific tariff TAR and a value for the clocking TAK for a predeterminable telecommunication service DIE, for example for the voice transfer SPR or a telefax service FAX, can be assigned to the subscriber TEI: A and/or B in the database DAT1 assigned to the service control center SCP. Information about the status STA: J and/or N of a subscriber TEI: A and/or B can also be input, for example whether the subscriber can or cannot use a specific service DIE, SPR, FAX. A subscriber A, B can for example decide to pay a higher basic charge and have their charges determined with a higher degree of accounting precision. Such an application can then for example be made to the operator of the service control center SCP.

Referring to FIG. 5 a database DAT2, which is directly assigned to the charge calculation point GBS, can have a predeterminable clocking TAK for predeterminable services DIE, SPR, FAX for the subscribers A, B. Instead of directly assigning tariff rates TAR to the services DIE, SPR, FAX, as can be provided for with the database DAT1 for the service control center SCP, a destination-based tariff rate may be preferred.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for calculating a running charge for a subscriber's use of a service in a telecommunication system, comprising the steps of:
    transmitting tariff rate information from a service operator to a charge calculation point of a first network of said telecommunication system, wherein the subscriber accesses a cross-network service provided by said service operator via said first network, and wherein a first clocking is defined within said first network,
    transmitting a second clocking from said service operator to said calculation point, said second clocking being set by said service operator and defining a minimum time interval for said charge calculation, wherein said second clocking determines an accounting precision of said charge calculation, and wherein said second clocking differs from said first clocking defined within said first network,
    determining a time of service usage via said minimum time interval and said second clocking and transmitting said time of usage to said calculation point,
    multiplying, at said calculation point, said tariff rate by said second clocking to arrive at a charge,
    summing a predetermined successive number of said charge to arrive at a running charge, said predetermined number corresponding to said second clocking and time of usage, and
    transmitting said running charge to the subscriber, wherein said running charge is based upon said accounting precision defined by said second clocking set by said service operator.

2. The method according to claim 1, wherein said running charge is displayed in human recognizable form by a telecommunication terminal of said subscriber.

3. The method according to claim 1, further comprising the step of storing said second clocking and tariff rate, by subscriber, in a database.

4. The method according to claim 1, wherein said second clocking is service dependent.

5. The method according to claim 1, wherein said second clocking is controlled by a service control center based upon at least one of a subscriber and said service and further comprising the step of transmitting information about said second clocking to said charge calculation point.

6. The method according to claim 2, further comprising the step of storing said second clocking and tariff rate, by subscriber, in a database.

7. The method according to claim 2, wherein said second clocking is service dependent.

8. The method according to claim 2, wherein said second clocking is controlled by a service control center based upon at least one of a subscriber and said service and further comprising the step of transmitting information about said second clocking to said charge calculation point.

9. A telecommunication system including a charge calculation point, comprising:
    a first subscriber network operating at a first clocking and having a charge calculation point;
    a gateway connecting the first subscriber network to a second subscriber network, said gateway comprising means for determining a second clocking defined for a cross-network telecommunication service when a subscriber of the first subscriber network uses the cross-network telecommunication service;
    means for transmitting tariff rate information from the gateway to said calculation point,
    means for transmitting the second clocking from the gateway to said calculation point, said second clocking being set by a service operator of the cross-network telecommunication service and defining a minimum time interval for said charge calculation, wherein said second clocking determines an accounting precision of said charge calculation,
    means for determining a time of service usage via said minimum time interval and said second clocking and transmitting said time of usage to said calculation point,
    means for multiplying at said charge calculation point, said tariff rate by said second clocking to arrive at a charge,
    means for summing at said charge calculation point a predetermined successive number of said charge to arrive at a running charge, said predetermined number corresponding to said second clocking and time of usage, and
    means for transmitting said running charge to a subscriber, wherein said running charge is based upon said accounting precision defined by said second clocking set by said service operator.

10. The telecommunication system according to claim 9, wherein said subscriber includes a telecommunication terminal with a display, such that when said running charge is transmitted to said subscriber, said running charge is displayed upon said display.

11. The telecommunication system according to claim 9, further comprising at least one database programmed for storing clocking and tariff information by at least one of a subscriber and service.

12. The telecommunication system according to claim 9, wherein said second clocking is service dependent.

13. The telecommunication system according to claim 9, wherein:
    said gateway comprises said means for transmitting said second clocking to said charge calculation point.

14. The telecommunication system according to claim 9, further comprising:
    a service control center comprising means for controlling said second clocking based upon at least one of said subscriber and said service, said control center further comprising said means for transmitting information about said second clocking to said charge calculation point.

15. The telecommunication system according to claim 10, further comprising at least one database programmed for storing clocking and tariff information by at least one of a subscriber and service.

16. The telecommunication system according to claim 10, wherein said second clocking is service dependent.

17. The telecommunication system according to claim 10, wherein:
    said gateway comprises said means for transmitting said second clocking to said charge calculation point.

18. The telecommunication system according to claim 10, further comprising:
    a service control center comprising means for controlling said second clocking based upon at least one of said subscriber and said service, said control center further comprising said means for transmitting information about said second clocking to said charge calculation point.

* * * * *